Sept. 26, 1950     E. S. RUSSEY     2,523,847
THRUST WASHER
Filed July 27, 1945
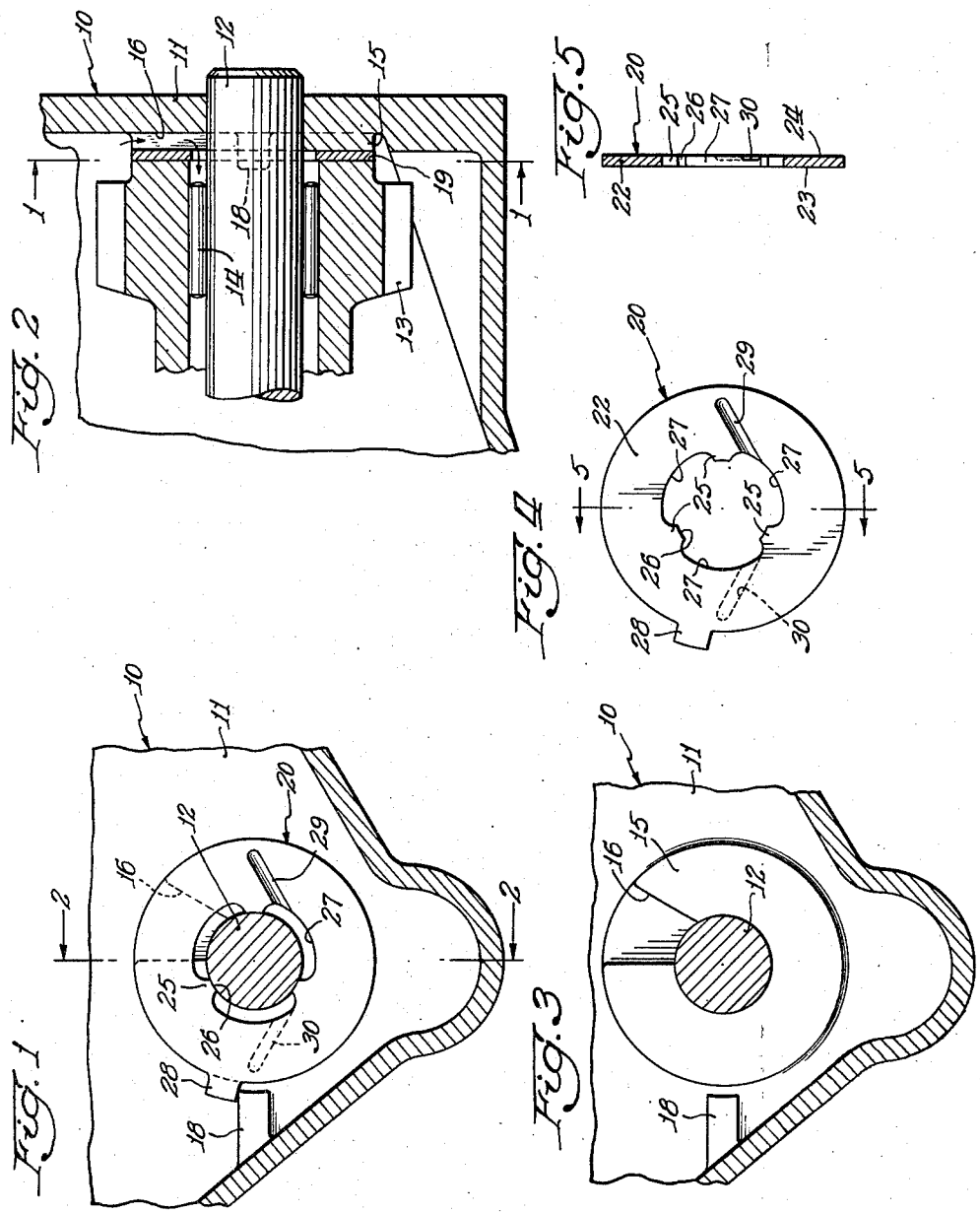
Inventor:
Edward S. Russey Patented Sept. 26, 1950

2,523,847

UNITED STATES PATENT OFFICE 2,523,847

THRUST WASHER

Edward S. Russey, Muncie, Ind., assignor to Borg-Warner Corporation, Chicago, Ill., a corporation of Illinois Application July 27, 1945, Serial No. 607,330

9 Claims. (Cl. 308—163)

My invention relates generally to washers and more particularly to that type of washer known as a thrust washer.

Thrust washers of many different kinds are currently in use and the form which they take and the degree of care employed in producing them vary in accordance with the application to which they are put. As an example of one application calling for a thrust washer constructed accurately and within precise limits, there may be considered the use of such a washer in an automotive vehicle wherein it is positioned between a wall of the transmission housing and a revolving member such as a gear or gear cluster. In such a case the washer must be dimensioned within rather precise tolerances in order not to bind the high speed movement of the gear or gear cluster. Washers so employed are frequently formed with a tang or other form of projection struck out axially from the face of the washer so as to be positioned substantially parallel to the axis of the washer or be inclined at an angle with respect to said axis. Such tang or projection serves through its abutment with the stationary wall of the transmission housing to prevent constant rotation of the washer. The formation of a tang in this manner frequently results in the deformation of the washer. Deformation of any kind which causes the washer to have its bearing surfaces shifted from a 90° angle with respect to the axis of the washer will cause binding of the adjacent revolving member.

It is an object of my invention to provide an improved form of thrust washer having a projection formed thereon for abutment with the transmission housing, the projection or tang being of such form and in such a location that during its construction there is no tendency for it to become deformed. To this end the tang is formed as an integral radial extension on the outer edge of the body of the washer. A further advantage which resides in the type of washer which I have invented is that it is cheaper to produce than many of those currently in use.

It will be obvious to those skilled in the art that a thrust washer employed in connection with elements of a high speed transmission in an automotive vehicle or the like, requires that constant and adequate lubrication of the surfaces between which the washer is positioned be provided. Lubrication must also be provided to the adjacent revolving gears or like members in the transmission which may be supported for rotation upon a supporting member. It is a further object of my invention, therefore, to provide an improved form of washer which will permit lubrication of the bearing surfaces of the washer as well as to permit the lubrication of the adjacent revolving member upon its supporting member. To this end certain channels are formed axially in the washer and have associated with them lubricant bearing grooves in the flat bearing surfaces of the washer.

Other objects and advantages will become apparent during a consideration of the following written description of my invention taken in connection with the accompanying drawings in which:

Fig. 1 is a vertical sectional view taken on the line 1—1 of Fig. 2, of a portion of a transmission housing showing my improved washer in elevation;

Fig. 2 is a central sectional view taken on the line 2—2 of Fig. 1;

Fig. 3 is a view similar to Fig. 1 with the washer removed;

Fig. 4 is an elevational view of my improved washer; and

Fig. 5 is a vertical sectional view of said washer taken on the line 5—5 of Fig. 4.

Like characters of reference in the several views represent like parts of the mechanism.

Referring now to the drawings numeral 10 represents a transmission housing generally. The wall portion 11 of said housing serves to support one end of a shaft 12 on which is supported for rotation a gear 13 as by means of bearings 14, which gear member may be an independent gear or a portion of a gear cluster constituting the countershaft of the transmission. An annular boss 15 formed integrally with the wall portion 11 of the transmission housing 10 has a lubricant passageway 16 leading vertically from the upper portion of the transmission housing into the center of the boss 15. It will be noted that the supporting shaft 12 for the gear member 13 passes through the center of said boss and is supported in the wall portion 11. A lug 18 is formed integrally with the transmission housing 10 and lies adjacent the boss 15.

To absorb endwise thrust from the gear 13, or the gear cluster of which it may be a part, there is interposed between the boss 15 of the wall portion 11 and the adjacent rotating surface 19 of the gear 13 a thrust washer designated generally by the reference numeral 20. The body portion 22 of the washer 20 is generally annular in shape and has flat parallel sides 23 and 24 serving as bearing surfaces between the gear 13 and the boss 15, respectively. Inwardly extending projections 25 formed on the body portion 22 are curved as at 26 at their radially innermost portion concentric with the curvature of the shaft 12 on which the washer 20 is adapted to be positioned. The three projections 25 define between them three channels 27. An extension or tang 28 formed integrally with the body portion 22 of the washer extends outwardly from the outer edge of said body portion along a radius of the washer. Due to the direction of rotation of gear member 13 said washer is rotated about the shaft 12 into a position where its tang 28 abuts against the lug 18 which is formed on the transmission housing 10. When the washer reaches this position it is held against further rotation in that direction.

Since the washer serves not only to absorb endwise thrust of the gear member 13 but also serves as a bearing member between it and the transmission housing by means of its flat parallel surfaces 23 and 24, it is necessary that an adequate supply of lubricant be supplied to such surfaces, particularly to that point where surface 19 of the gear member 13 engages surface 23 on the washer. To provide such lubrication a lubricant groove such as groove 29 is formed in bearing surface 23 of the washer 20 and extends from one of the channels 27 outwardly toward the outer edge of said washer. As gear member 13 rotates it picks up oil from the groove 29 and spreads it between the surfaces 19 and 23.

The static oil level within the transmission housing 10 is such that gear member 13 and the associated washer 20 are submerged in the oil. In order to supply lubricant to the bearings 14 on which the gear member 13 rotates and in order to supply oil to the oil groove 29 and to a similar oil groove 30 in the surface 24 of washer 20 there has been provided the previously described lubricant passageway 16 in the boss 15 which is formed integrally with transmission housing 10. Referring to Fig. 2 it will be seen that the lubricant flows in the direction indicated by the arrows through the passageway 16, the channel 27 in the washer 20, the annular space between shaft 12 and the inner diameter of gear 13 to the bearing 14. At this time oil also flows into the oil grooves 29 and 30 which open into channels 27 in the washer 20.

From the foregoing description it will be seen that I have provided an improved type of thrust washer which is so formed as to supply adequate lubricant to the adjacent members with which it is associated. Furthermore it is more easily and successfully constructed than other forms of washers by reason of having its tang extending outwardly from the outer edge of the body portion of the washer rather than having it struck out axially from the body of the washer, since the latter type of construction frequently results in distortion of the washer and its bearing surfaces.

Although I have illustrated my improved washer in connection with the counter shaft of a change speed gear transmission it will be readily apparent that such washer will find many other uses. Furthermore, I do not intend to be limited to the precise form illustrated since various changes in size and shape, or other modifications coming within the scope of my invention, will readily suggest themselves to those skilled in the art.

I claim:

1. A thrust washer comprising an annular body portion having substantially parallel sides serving as bearing surfaces, a plurality of radially inwardly extending projections adapted to bear upon a member which may be passed through the open part of said body portion, said inwardly extending projections defining between them axially extending channels leading from one side of the body portion to the other, there being a groove in each bearing surface extending from one of said channels outwardly toward the outer edge of the body portion, and a tang extending radially outwardly from the outer edge of the body portion.

2. A thrust washer comprising an annular body portion having a central opening extending therethrough and having substantially parallel sides serving as bearing surfaces, and a plurality of radially inwardly extending projections adapted to bear on a member which may be passed through said central opening, said inwardly extending projections defining therebetween axially extending channels leading from one side of the body portion to the other, there being a groove in each bearing surface extending from one of said channels outwardly toward the outer edge of the body portion.

3. In a transmission, in combination, a transmission housing having a wall portion, a lug connected with said housing, a rotatable member having a surface in opposed relation with respect to said wall portion, a washer interposed between said surface and wall portion, said washer comprising an annular body portion having substantially parallel sides providing bearing surfaces with one of said surfaces being in engagement with said first-mentioned surface, a plurality of radially inwardly extending projections and a radially outwardly extending projection, said latter projection being adapted to abut against said lug and thereby hold said washer against rotation.

4. In a transmission in combination, a transmission housing having a wall portion, a lug formed on said wall portion, a support carried by said wall portion, a member rotatable about said support and having a surface opposed to said wall portion, and a thrust washer interposed between said surface and said wall portion, and being positioned about said support, said washer comprising an annular body portion having parallel sides serving as bearing surfaces, a plurality of radially inwardly extending projections adapted to bear upon said support and defining between them channels extending axially from one side of the body portion to the other, there being a groove in each bearing surface extending from one of said channels outwardly toward the outer edge of the body portion, and a tang extending radially outwardly from the outer edge of the body portion and adapted to abut against said lug and thereby hold said washer against rotation, and a passageway in said wall portion adjacent said washer and leading to said channels for supplying lubricant therethrough to said support for the rotatable member and to said grooves.

5. In a transmission, in combination, a transmission housing having a wall portion, a lug connected with said housing, a rotatable member having a surface in opposed relation with respect to said wall portion, a washer interposed between said surface and wall portion and having parallel sides providing bearing surfaces in engagement with said first-mentioned surface and a surface on said wall portion, said washer comprising an annular body portion having a plurality of radially inwardly extending projections defining between them axially extending channels leading from one side of the body portion to the other, there being a groove in each bearing surface extending from one of said channels outwardly toward the outer edge of the body portion, and a radially outwardly extending projection on said washer and adapted to abut against said lug and thereby hold said washer against rotation.

6. In a transmission, in combination, a transmission housing having a wall portion, a support carried by said wall portion, a member rotatable about said support and having a surface in opposed relation with respect to a surface of said wall portion, a washer interposed between said surfaces and provided with an opening receiving said support, said washer comprising a body portion with substantially parallel sides serving as bearing surfaces, a plurality of radially inwardly extending projections adapted to bear upon said support and defining between them axially extending channels leading from one side of the body portion to the other, there being a groove in each bearing surface extending from one of said channels outwardly toward the outer edge of the body portion to supply lubricant to said surfaces, and a projection extending radially outwardly from the outer edge of said body portion and adapted to engage said housing to hold said washer against rotation.

7. In a transmission, in combination, a transmission housing having a wall portion, a support carried by said wall portion, a member rotatable about said support and having a surface opposed to said wall portion, and a thrust washer interposed between said surface and said wall portion with its opposite parallel sides engaging the same and having an opening through which said support extends, said washer comprising a plurality of radially inwardly extending projections defining between them channels extending from one side of said washer to the other, and a projection engaging said housing to hold the washer against rotation, and a passageway in said wall portion adjacent said washer and leading to said channels for supplying lubricant therethrough to said support for the rotatable member.

8. A thrust washer comprising a body portion having substantially parallel sides serving as exterior bearing surfaces and provided with an opening therethrough defining an interior bearing surface adapted to bear upon a member which may be passed through said opening, there being a plurality of channels formed in said interior bearing surface leading from one side to the other of said body portion, there being a groove in each exterior bearing surface extending from one of said channels outwardly toward the outer edge of the body portion for supplying lubricant to the exterior bearing surfaces.

9. A thrust washer comprising a body portion having substantially parallel sides serving as exterior bearing surfaces and provided with an opening therethrough defining an interior bearing surface adapted to bear upon a member which may be passed through said opening, there being a plurality of channels formed in said interior bearing surface leading from one side to the other of said body portion, there being a groove in each exterior bearing surface extending from one of said channels outwardly toward the outer edge of the body portion for supplying lubricant to the exterior bearing surfaces, and a projection extending radially outwardly from the outer edge of the body portion.

EDWARD S. RUSSEY.

REFERENCES CITED

The following references are of record in the file of this patent:

UNITED STATES PATENTS

| Number | Name | Date |
|---|---|---|
| 157,289 | Matthew | Dec. 1, 1874 |
| 1,120,344 | Templin | Dec. 8, 1914 |
| 1,901,710 | Flaherty | Mar. 14, 1933 |
| 2,320,770 | Cover | June 1, 1943 |

FOREIGN PATENTS

| Number | Country | Date |
|---|---|---|
| 293,912 | Italy | 1932 |